Patented Sept. 13, 1932

1,877,116

UNITED STATES PATENT OFFICE

ARTHUR ZITSCHER AND WILHELM WÜTERICH, OF OFFENBACH-ON-THE-MAIN, GERMANY, ASSIGNORS TO GENERAL ANILINE WORKS, INC., OF NEW YORK, N. Y., A CORPORATION OF DELAWARE

PROCESS FOR TREATING WATER-INSOLUBLE AZO DYESTUFFS

No Drawing. Application filed October 2, 1929, Serial No. 396,931, and in Germany October 31, 1928.

In the U. S. applications Serial Nos. 318,992 and 318,993, filed December 13, 1927, there is described a process of manufacturing water-insoluble azodyestuffs which consists in combining an N-nitroso-4-diazo-diarylamine with an arylamide of 2-hydroxy-3-naphthoic acid and in eliminating the nitroso-group from the dyestuff thus formed. The elimination is effected according to the said applications by a saponifying agent, advantageously in the presence of a reducing agent, sulfites being named among suitable reducing agents.

Our present invention relates to an improved process for the said elimination of the nitroso-group which process comprises treating a water-insoluble azodyestuff of the probable general formula:

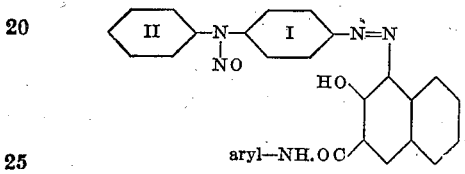

in which formula the naphthalene as well as the two benzene nuclei may contain further substituents other than sulfonic or carboxylic acid groups and the benzene nucleus signified by II may be replaced by a naphthalene nucleus, with a sulfite and with a leuco-quinone compound of the general formula:

$$R\begin{matrix}OH\\X\end{matrix}$$

wherein R means a radical of the benzene or naphthalene series and X, standing in ortho- or para-position to OH, means a hydroxy-, amino- or alkyl-amino-group.

Such leuco-quinone compounds are, for instance, hydroquinone, pyrocatechine, pyrogallol, hydroxy-hydroquinone, para- and ortho-aminophenols which may be alkylated at the nitrogen atom, suitable amino-naphthols, the sulfonic and carboxylic acid derivatives and other suitable substitution products of the named compounds. But these compounds may also be applied in situ. For instance, benzo- or naphtho-quinones may be used because they are converted into the corresponding leuco compounds by the sulfite simultaneously present.

The sulfite may be applied in the form of bisulfites or neutral sulfites or with an excess of a free alkali.

By the reaction being object of the present invention the group

of the dyestuffs is easily converted into the group

by the simultaneous action of the sulfite and the leuco-quinone compound. It is, however, not exactly known what reaction the NO group undergoes when being split off by the action of the said agents. It is assumed that the leuco-quinone reduces the NO compound, whereby the leuco-quinone itself is oxidized and converted into the corresponding quinone or quinone-imide compound which latter compound is then again reduced by the sulfite to form the initial leuco compound, etc. According to this hypothesis the leuco-quinone compound would act like a catalyst and it has in fact been found that even small amounts of the leuco compound give good results in our new reaction.

Reducing agents which are suitable for the present process are those agents the reducing action of which is sufficiently strong for entirely splitting off the NO group but not so strong as to reduce the azo group. Whereas by means of sulfite alone the duration of the reaction is very long and troublesome, our new process of applying sulfites in the presence of leuco-quinone compounds effects a quick and complete elimination of the NO group without injury to the azo group.

The present improved process, therefore, is of a special importance for aftertreating piece-goods in machine dyeing, since the nitroso-group can be quickly and quantitatively split off by it in a continuous process. Even when they remain for a long time in the eliminating bath the dyed goods suffer no injury as to the quality of the dyeing either by splitting up the azo-group or in any other way.

In order to further illustrate our invention the following examples are given; but we wish it to be understood that we are not limited to the particular products or reaction conditions mentioned therein.

*Example 1*

Cotton yarn is dyed by means of 4-diazo-4'-ethoxy-diphenyl-nitrosamine and 2'-hydroxy-3'-naphthoyl-4-chloroaniline as described in Example 2 of U. S. application Serial No. 318,992. Then it is cold rinsed and aftertreated for a quarter of an hour in a boiling bath containing per liter 5 grs of sodium sulfite, 0.2 grs of hydroquinone, 3 grs of calcined soda and 3 grs of soap. Then it is rinsed hot and cold and dried.

In this manner the original garnet like dyeing is converted into a bloomy navy blue dyeing. The dyestuff thus produced on the fiber is identical to that described in Example 3 of U. S. application Serial No. 318,993.

*Example 2*

A hank of silk, which is dyed by means of 4-diazo-4'-methoxy-diphenyl-nitrosamine and 2'-hydroxy-3'-naphthoyl-4-toluidine as described in Example 5 of U. S. application Serial No. 318,992, is well rinsed and treated for a quarter of an hour with a boiling bath containing per liter 10 cc of a sodium-bisulfite solution of 30% strength and 0.5 grs of 1-amino-2-hydroxy-naphthalene-4-sulfonic acid. Then it is rinsed hot and cold and dried.

In this manner a clear blue dyeing is obtained. The dyestuff thus produced on the fiber is identical to that of Example 4 of U. S. application Serial No. 318,993.

*Example 3*

Viscose is prepared in the known manner with a padding solution containing per liter 2 grs of 2-hydroxy-3-naphthoyl-aniline. Then it is well centrifugated and developed with the following diazo-solution:

2.1 grs of 4-amino-4'-methoxy-diphenylamine-sulfate are made into a paste with 10 cc of boiling water and 2.3 cc of hydrochloric acid of 20° Bé., mixed with 70 cc of ice-water and diazotized with a solution of 1.2 grs of sodium-nitrite in 100 cc of water. The diazo-solution is mixed with 0.25 grs of magnesium-oxide, 10 grs of common salt and 2 grs of crystallized magnesium-sulfate and the whole is made up to 1 liter.

The dyed fiber is well rinsed hot and cold. Then it is soaped for about 20 minutes in a boiling bath containing per liter 5 grs of soap of Marseille, 5 grs of sodium-sulfite and 0.2 grs of ortho- or para-aminophenol. Thereafter it is rinsed hot and cold, soaped again for a quarter of an hour with a solution containing per liter 5 grs of soap of Marseille, rinsed again hot and cold and dried.

The original garnet red dyeing has become by this aftertreatment clear greenish blue. The dyestuff thus produced on the fiber is identical to that described in Example 1 of U. S. application Serial No. 318,993.

*Example 4*

Cotton piece goods are impregnated on the foulard with a solution containing per liter 15 grs of 2'-hydroxy-3'-naphthoyl-4-chloroaniline, 20 cc of Turkey red oil and 24 cc of a caustic soda solution of 34° Bé., well squeezed off and advantageously dried. Then they are developed at about 10° C. on the foulard with the following diazo-solution:

16 grs of 4-amino-4'-methoxy-diphenylamine are dissolved in water and 25 cc of hydrochloric acid of 20° Bé. and diazotized at about 15° C. with a solution of 8.5 grs of sodium-nitrite in 50 cc of water. After half an hour's standing the diazo-solution is filtered, mixed with 15 grs of sodium-acetate and then made up with cold water to 1 liter.

After rinsing in the cold the goods are treated in the open width on a washing machine charged with a boiling solution containing per liter 4.5 grs of sodium-sulfite, 0.5 grs of pyro-gallol, 3 grs of calcined soda and 3 grs of soap. Then they are well rinsed hot and cold and dried. The original deep red dyeing turns thereby to blue. The dyestuff thus produced on the fiber is identical to that of Example 9 of U. S. application Serial No. 318,993.

We claim:—

1. A process which comprises treating a water-insoluble azo-dyestuff fixed on the fiber and corresponding probably to the general formula:

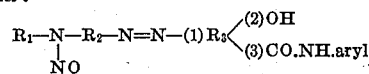

wherein $R_1$ represents a radical of the benzene or naphthalene series, $R_2$ a radical of the benzene series, $R_3$ a radical of the naphthalene series and wherein the $-N=N-$ group is attached in para-position to the

group, with a sulfite, and with a leuco-quinone compound of the general formula:

wherein R represents a radical of the benzene or naphthalene series and X, standing in ortho- or para-position to OH, means a hydroxy-, amino- or alkyl-amino-group.

2. A process which comprises treating a water-insoluble azo-dyestuff fixed on the fiber and corresponding probably to the general formula:

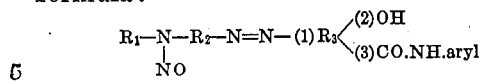

wherein $R_1$ represents a radical of the benzene or naphthalene series, $R_2$ a radical of the benzene series, $R_3$ a radical of the naphthalene series and wherein the $-N=N-$ group is attached in para-position to the

group, with a sulfite, and with a leuco-quinone compound of the general formula:

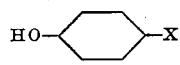

wherein X means a hydroxy-, amino- or alkyl-amino-group.

3. A process which comprises treating a water-insoluble azodyestuff fixed on the fiber and corresponding probably to the general formula:

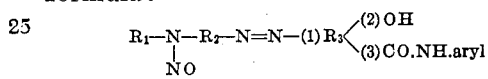

wherein $R_1$ represents a radical of the benzene or naphthalene series, $R_2$ a radical of the benzene series, $R_3$ a radical of the naphthalene series and wherein the $-N=N-$ group is attached in para-position to the

group, with an alkali sulfite and with para-aminophenol.

4. A process which comprises treating the azo-dyestuff fixed on the fiber and corresponding to the following formula:

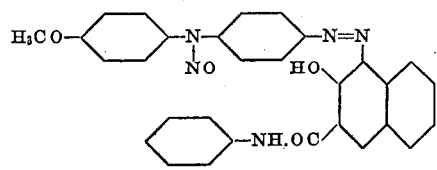

with sodium sulfite and with para-aminophenol.

In testimony whereof, we affix our signatures.

ARTHUR ZITSCHER.
WILHELM WÜTERICH.